United States Patent [19]

Nachtigal et al.

[11] 3,967,515

[45] July 6, 1976

[54] APPARATUS FOR CONTROLLING VIBRATIONAL CHATTER IN A MACHINE-TOOL UTILIZING AN UPDATED SYNTHESIS CIRCUIT

[75] Inventors: Chester L. Nachtigal, West Lafayette, Ind.; Richard G. Klein, Hudson; Kenneth C. Maddux, Terrace Park, both of Ohio

[73] Assignee: Purdue Research Foundation, West Lafayette, Ind.

[22] Filed: June 13, 1975

[21] Appl. No.: 586,572

Related U.S. Application Data

[63] Continuation-in-part of Ser. No. 469,356, May 13, 1974, abandoned.

[52] U.S. Cl. ............................ 82/2 B; 82/DIG. 9; 51/103 R; 51/165.77; 51/165.92; 90/11 R; 235/151.11; 318/561
[51] Int. Cl.² ..................... B23B 7/00; B23B 25/06
[58] Field of Search ..................... 82/2 B, DIG. 9; 318/561, 571; 51/165.77, 165.92, 103 R; 235/151.11; 90/11 R

[56] References Cited
UNITED STATES PATENTS

| | | | |
|---|---|---|---|
| 3,473,435 | 10/1969 | Tse et al. | 82/DIG. 9 |
| 3,671,840 | 6/1972 | Meyer et al. | 318/571 |
| 3,754,487 | 8/1973 | Nachtigal | 82/DIG. 9 |
| 3,908,315 | 9/1975 | Schaller | 51/103 R |

*Primary Examiner*—Leonidas Vlachos
*Attorney, Agent, or Firm*—Jenkins, Hanley & Coffey

[57] ABSTRACT

A method and apparatus for controlling vibrational chatter in a machine tool operation wherein a workpiece and a tool are mounted in a manner to permit controlled and forced engagement of the tool and workpiece to remove material from said workpiece. A first transducer is spatially disposed from the tool-workpiece interface and generates an electrical signal representative of the applied cutting forces on the workpiece. This force signal is applied to a workpiece movement synthesis circuit for continuous calculation of the workpiece displacement in response to cutting forces and in accordance with continuously updated static and dynamic characteristics of the machine structure and the workpiece. Simultaneously, another transducer on the machine structure continuously provides a tool acceleration signal for use in deriving an electrical signal representing the actual displacement of the tool.

The synthesis circuit output signal representing the calculated workpiece displacement is electronically compared with the signal representing the actual tool displacement, with vibrational chatter occurring whenever the two signals are not equal and offsetting. When the two signals are not equal, the differential therebetween is used to generate an error signal for controlling a compensatory force actuator mounted on the machine structure. The compensatory actuator provides forces of controlled magnitude and frequency to the machine structure to offset and eliminate the vibrational chatter.

9 Claims, 10 Drawing Figures

APPARATUS FOR CONTROLLING VIBRATIONAL CHATTER IN A MACHINE-TOOL UTILIZING AN UPDATED SYNTHESIS CIRCUIT

BACKGROUND OF THE INVENTION

This application is a continuation-in-part of co-pending application Ser. No. 469,356, filed May 13, 1974 and now abandoned.

This application relates to method and apparatus for controlling vibrational chatter in a machine tool operation, and more specifically, to a method and apparatus for continuously controlling vibrational chatter in a machine tool operation in accordance with varying static and dynamic machine and workpiece characteristics.

In the operation of lathes, boring bars, milling machines, drill presses, broaching machines, etc., it is desirable that the machine tool be operated at the maximum possible rate of production. This means that the cutting tool must move into the workpiece to remove material from the surface thereof at the maximum possible rate, and therefore, that the maximum possible cutting force is used. However, as a practical matter, the use of a relatively large cutting force greatly increases the likelihood of severe vibrational or oscillatory motion forces appearing at the tool-workpiece interface. These vibrational forces result from a variety of problems, and are highly detrimental to proper machine operation. Further, these vibrational forces are often amplified mechanically to cause what is commonly referred to as regenerative chatter. Some examples of causes of such vibrations are when the workpiece is mounted on the machine in a non-centered manner, when the workpiece is out of round, or when the workpiece has an irregular surface configuration or discontinuous hard and soft surface areas.

Severe vibrational forces can also occur whenever the inherent natural vibrational frequency of either the machine structure or the workpiece is reached. This is a particularly troublesome problem, especially since the natural workpiece frequency continuously varies as material is machined therefrom. Moreover, the natural workpiece frequency is also dependent upon the mechanical compliance of the workpiece, and this compliance factor varies along the length of the workpiece. For example, when a lathe is used to remove material from the surface of a cylindrical workpiece, the displacement of the cylinder in response to the applied cutting force continuously increases from the supported ends of the workpiece toward the center of said workpiece. This displacement is a measure of mechanical compliance.

All of these sources of vibration can result in undesirable and non-uniform deviations in the desired path of motion of the cutting tool with respect to the workpiece surface. That is, the occurrence of these vibrational forces can cause non-uniform relative motions between the workpiece and the cutting tool at their interface, and thereby result in the tool imparting non-uniform machining forces to the workpiece. Of course, the existence of non-uniform machining forces causes the tool to machine an undesirable non-uniform surface on the workpiece.

Several methods and types of apparatus have been utilized to reduce or negate the occurrence of these undesirable vibrations, or chatter, at the tool and workpiece interface. One method has been to simply reduce the rate at which material is removed from the workpiece. Another method has been to secure metal plates or "clamping blocks" to the machine structure at strategic locations to reduce the possibility of the machine structure reaching its natural vibrational frequency during a machining operation. The former method undesirably decreases the rate of production, and the latter method does not account for vibrations due to the workpiece reaching its natural resonating frequency.

A more complex method of negating tool and workpiece vibrations is dislcosed in Nachtigal, U.S. Pat. No. 3,754,487. This method utilizes a controller to act upon a directly measured cutting force signal generated by a transducer coupled to the cutting tool. The controller responds to the cutting force signal and to a tool position signal to generate a control signal for appropriately and directing adjusting tool position to compensate for cutting force variations. This method and its associated apparatus thus requires direct force measurement and direct force compensation. However, such direct measurement and compensation is not practical in many machine tool operations because of the difficulty in measuring the cutting force directly at the cutting tool. Furthermore, the disclosed method and apparatus does not provide any means for continuously accounting for changes in the static and dynamic characteristics of the workpiece and/or the cutting tool or machine structure during a machining operation.

It is therefore desirable to provide an automatic method and apparatus for controlling undesired vibrations in a machine tool operation by continuously responding to the applied cutting force as well as to varying static and dynamic characteristics of the machine structure and the workpiece to allow a maximum cutting force to be used. Such a method and apparatus is desirable to permit the machining process to be continuously conducted with optimal efficiency while maintaining an improved surface finish on the workpiece, reducing machine noise levels, promoting longer tool and machine life, and making possible increased dimensional precision between successively machined workpieces.

SUMMARY OF THE INVENTION

In accordance with the invention, the workpiece and a cutting tool are mounted in a machine structure, and the tool is moved into contact with the surface of the workpiece to remove material therefrom. This results in a machining or cutting force being applied to the workpiece, and this cutting force is reflected back through the tool and machine structure. A first transducer on the machine structure and spaced from the tool and workpiece interface measures the reflected cutting force, and generates an electrical signal indicative thereof. Because the measured force is reflected through the machine structure, said transducer signal is inherently altered by the static and dynamic characteristics of said machine structures.

The acceleration of one of the cutting tool and workpiece, e.g., the tool, is continuously detected by a second transducer which generates a signal that, after integration, is indicative of the actual displacement of the cutting tool. The signals from the first and second transducers are both applied to a workpiece movement synthesis circuit for electronic calculation of the workpiece displacement in response to the applied cutting force. More specifically, the synthesis circuit has its parameters continuously updated to continuously compensate for changes in the static and dynamic characteristics of the workpiece and the machine structure as material is removed from the workpiece. The resulting signal representative of the calculated workpiece displacement is electronically compared with the signal representing the actual displacement of the cutting tool, with any difference therebetween being indicative of the existance of undesirable vibrational forces, or chatter, at the tool-workpiece interface.

The difference between the two compared signals is used to generate an error signal for actuating and controlling a compensatory force actuator. The compensatory actuator mechanically applies compensatory forces of a controlled magnitude and frequency to the machine structure to supplement the applied cutting force and thereby adjust the tool displacement to eliminate the vibrational forces. Importantly, compensatory force synthesis circuits are provided to generate signals simulating the effects of compensatory forces directly upon the output of the first transducer and upon the workpiece displacement. These signals are utilized with the workpiece movement synthesis circuit to assure that the output of the workpiece movement synthesis circuit always represents the total calculated displacement of the workpiece. Thus, the compensatory forces adjust the tool displacement signal to follow the calculated workpiece displacement to reduce the error signal to zero and eliminate vibrations.

BRIEF DESCRIPTION OF THE DRAWINGS

The accompanying drawings illustrate the invention. In such drawings.

DETAILED DESCRIPTION OF THE PREFERRED EMBODIMENT

The invention of this application relates to method and apparatus for controlling undesirable vibrations in a machine tool operation. In general, in a machine tool operation, a cutting tool is engaged with the surface of a workpiece for removing material from the surface of said workpiece. During such engagement of a workpiece, undesirable vibrational forces can arise for a variety of reasons, some of which include when the workpiece is out of round or has an irregular surface, or when the machine structure or the workpiece resonant frequency is reached. All of these sources of vibration result in what is commonly referred to as vibrational chatter, and such vibrations are often mechanically amplified to result in severe vibrations commonly termed regenerative chatter. Naturally, the occurrence of chatter is highly detrimental to the workpiece surface finish and causes dimensional variations between successively machined workpieces.

Figure 1:
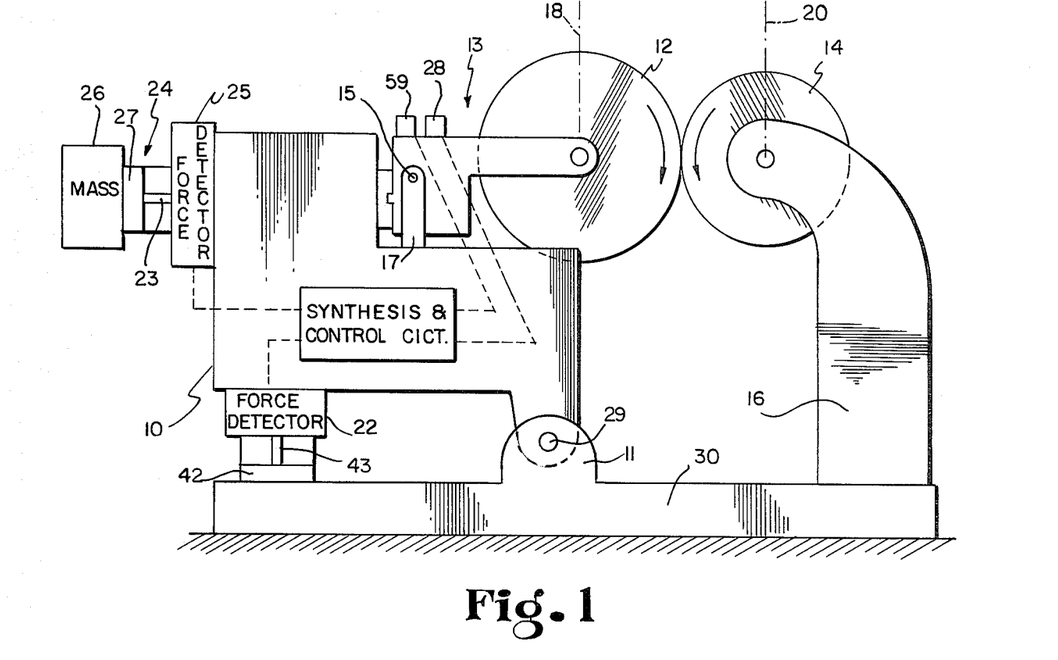
FIG. 1 is a diagrammatic side view of a center-type grinder showing the location of the transducers used in the invention.
Figure 2:
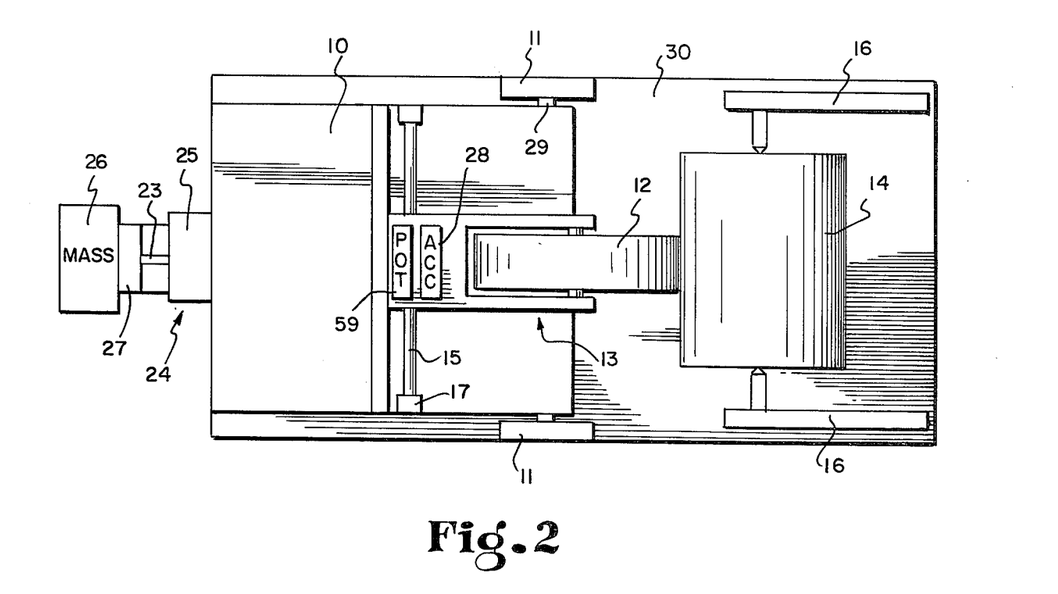
FIG. 2 is a diagrammatic top plan view of the grinder shown in FIG. 1.

The invention of this application is shown in FIGS. 1 and 2 as being employed for controlling vibrational chatter in a specific machine tool operation, namely, a representative center-type grinder. However, it is to be understood that the invention is intended for use with almost any type of machine tool operation wherein material is removed from a workpiece by a cutting tool.

The illustrated center-type grinder generally comprises a machine housing structure 10 rotatably mounted on a horizontal shaft 29. The shaft 29 has its opposite ends received in supports 11 at each side of a machine base 30. A grinding wheel assembly 13 is carried on the machine structure 10, and has a grinding wheel 12 mounted for rotation about its central axis. The wheel assembly 13 is controllably driven by suitable drive means (not shown) along a horizontal shaft 15 which has its ends carried by supports 17 on the machine structure. Suitable drive means are also provided for rotating the grinding wheel about its axis at a desired rate of speed, but again, said drive means is not shown in the drawings for purposes of clarity.

The grinding wheel 12 is engageable with the exterior surface of a cylindrical workpiece 14. As shown, said workpiece is mounted for rotation about its central axis between a pair of center supports 16 extending upwardly from the machine base 30. Drive means for controllably rotating the workpiece about its axis is provided in many common machine tool operations, with the rotational speed of the workpiece usually differing from the rotational speed of the grinding wheel. The workpiece rotating means, however, is omitted from the drawings for purposes of clarity.

A wheel movement actuator 42 is mechanially coupled to the machine base 30 and to the lower part of the machine structure 10 by a shaft 43. Thus actuator typically comrises a hydraulically actuated piston or feed screw apparatus, and is provided to mechanically move the structure 10 clockwise about the pivot shaft 29 as viewed in FIG. 1 for a desired distance to move the grinding wheel 12 into cutting engagement with the workpiece 14. As a result of this movement, a cutting force is exerted upon the workpiece by the grinding wheel, and an equal and opposite force is exerted upon the grinding wheel by the workpiece. The magnitude of these equal and opposite forces is related to the distance which the grinding wheel is caused to plunge into and cut the workpiece, as well as the rotational motions of the wheel and workpiece. These forces are reflected through the wheel and the workpiece and their respective holding structures.

As the grinding wheel removes material from the workpiece, several relative motions occur between the wheel and the workpiece at their interface. One of these relative motions is the rotational motion of the wheel and workpiece through their horizongal line of contact. Another relative motion is a traversal of the longitudinal length of the workpiece by the grinding wheel as the wheel assembly 13 travels along the horizontal shaft 15. Still another relative motion is the movement of the wheel into the workpiece to remove material therefrom. In conventional machine tool operations, these relative motions between the wheel and the workpiece are all substantially uniform motions, and thereby do not contribute significantly to the generation of vibrational chatter. Another relative motion, however, is a non-uniform movement of the grinding wheel into or away from the workpiece, and this relative movement by definition results in vibrational chatter. That is, if imaginary reference lines 18 and 20 illustrated in FIG. 1 are specified as being vertical references respectively passing through the centers of the grinding wheel and the workpiece, chatter occurs whenever the distance between lines 18 and 20 varies at a non-constant rate. In the alternative, chatter does not occur when the distance between the reference lines 18 and 20 remains constant, or varies at a constant rate.

Figure 3:
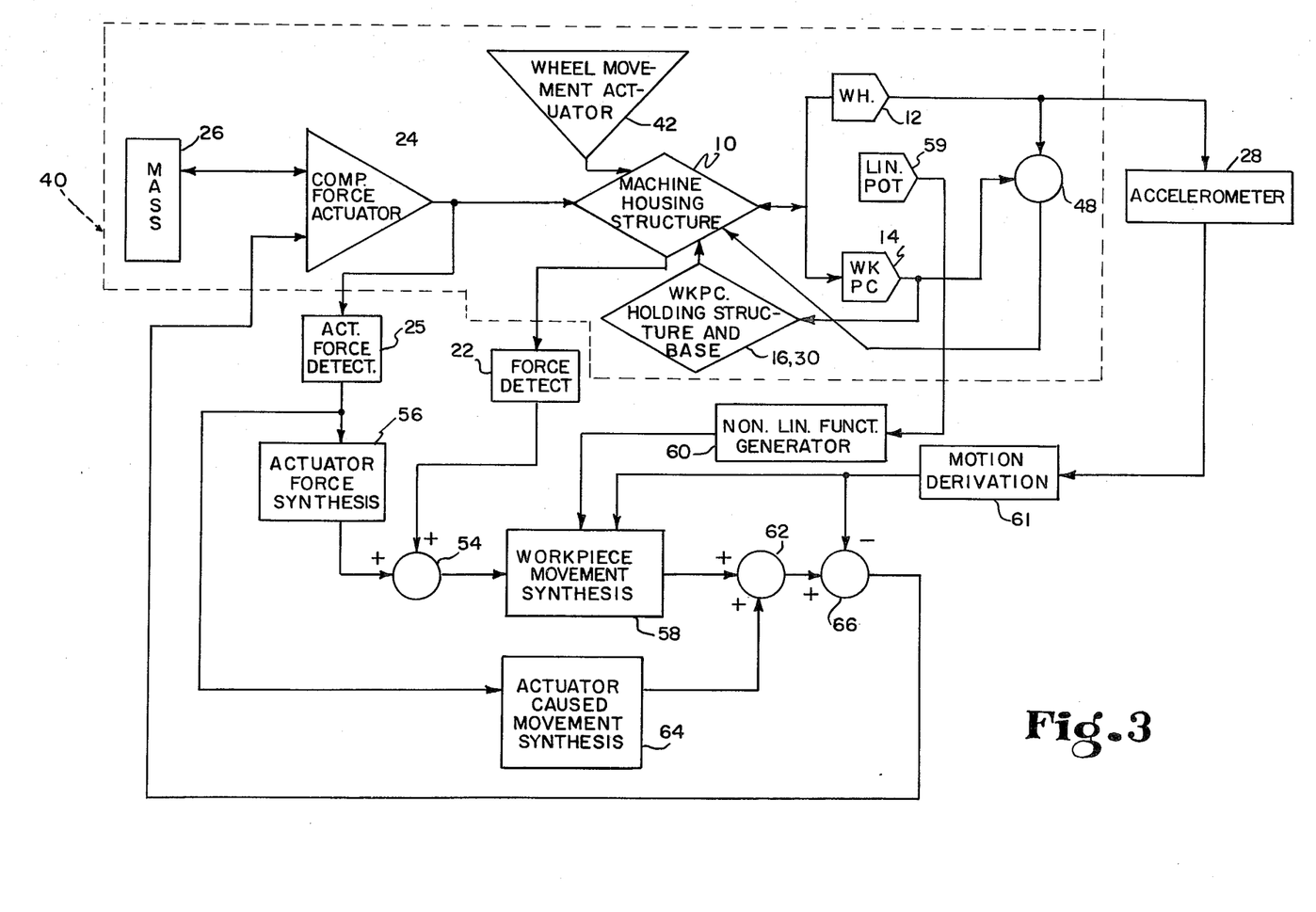
FIG. 3 is a block diagram illustrating the invention.

The method and apparatus of this invention for monitoring and negating vibrational chatter is best understood by simultaneous reference to the block diagram of FIG. 3 and to the center-type grinder shown in FIGS. 1 and 2. In FIG. 3, mechanical components and actions are set off from electronic components by a dotted line 40. As described above, the wheel movement actuator 42 mechanically moves the machine structure 10 about the pivot shaft 29 to cause the grinding wheel 12 to engage the workpiece 14 and to machine material therefrom. Upon such engagement, equal and opposite forces arise at the wheel/workpiece interface 48. That is, the wheel imparts a cutting force on the workpiece which is felt through the workpiece and its associated supporting structure. Similarly, the workpiece imposes an equal and opposite force upon the grinding wheel, and this force is reflected back through the grinding wheel and the machine structure 10.

In most machine tool operations, a direct measurement of the cutting force at the wheel/workpiece interface is essentially impossible. Therefore, in the control system of this invention, a transducer 22 such as a strain gage is mounted on the machine structure 10 between said structure and the wheel movement actuator 42. This transducer 22, or force detector, senses the effects of the force exerted upon the grinding wheel and reflected through the machine structure during a machining operation. That is, the force upon the grinding wheel tends to rotate the machine structure counterclockwise as viewed in FIG. 1, about its pivot shaft 29. The effects of this force is detected by the transducer 22 which generates an electrical signal representative thereof. Because the force exerted upon the grinding wheel is equal in magnitude to the cutting force upon the workpiece, the electrical output of the transducer 22 is also representative of said cutting force. However, the transducer output is not directly representative of the cutting force, since the detected force is inherently altered by static and dynamic characteristics of the grinding wheel 12 and the machine structure 10 as the force is reflected therethrough. Such dynamic characteristics include, for example, mechanical stiffness, damping ratio, and natural resonant frequency. Because of this inherent force alteration, the specific location of the transducer 22 on the structure is a matter of convenience only. However, as shown in FIG. 1, the transducer 22 is disposed at a distance from the pivot shaft 29 for maximum transducer sensitivity.

As illustrated in FIG. 3, the cutting force upon the workpiece at the wheel-workpiece interface 48 is reflected through the workpiece center supports 16 to machine base 30. To some extent, the cutting force is reflected further to the machine structure 10, and this can alter to some degree the magnitude of the output of the force transducer 22. However, in most machining operations, the effect of the cutting force upon the transducer output is substantially negligible. Therefore, it is safely presumed for purposes of this embodiment of the invention that the output of the force transducer 22 represents the cutting force upon the workpiece as altered by the static and dynamic characteristics of the gringing wheel 12 and the machine structure 10. This output is coupled to a summing junction 54, the purpose which will be hereafter explained, and further to a workpiece movement synthesis circuit 58.

An accelerometer 28 is mounted on the grinding wheel assembly 13 to provide an electrical signal representative of the actual horizontal acceleration of the assembly into or away from the workpiece. This signal, because the grinding wheel 12 is fixed with respect to the assembly 13, is thereby also representative of the actual horizontal acceleration of said grinding wheel into or away from the workpiece. The accelerometer output is coupled to a motion derivation circuit 61, shown in the block diagram of FIG. 3, for double integration to obtain an electrical output signal which continuously represents the actual displacement of the grinding wheel, and this output signal is used as one input to the workpiece movement synthesis circuit 58. Thus, when the grinding wheel is machining material from the workpiece, the output of the derivation circuit 61 represents the actual horizontal displacement of the grinding wheel into or away from the workpiece. Further, when chatter occurs, any non-uniform vibrational displacement of the grinding wheel in a horizontal direction is indicated by the output of the derivation circuit 61.

The specific construction of the motion derivation circuit 61 can be any electrical circuit for double integrating the output of the accelerometer 28. While the use of conventional analog integrating circuitry is preferred, no specific circuit construction is shown since such integrating circuits in general are believed to be well known by those skilled in the art.

As described above, the grinding wheel 12 not only plunges into the workpiece to machine material therefrom, but the wheel also traverses the longitudinal length of the workpiece 14 to machine the entire length of the workpiece. Thus, the point of application of the cutting force upon the workpiece travels along the length of the workpiece during one traversal thereof by the grinding wheel. This traveling effect of the cutting force presents a particularly difficult problem in machining operations because the compliance of the workpiece varies along the workpiece length. That is, the displacement of the workpiece in response to the applied cutting force increases from the supported workpiece ends toward the center of the workpiece length. This compliance factor must be taken into consideration for proper chatter control.

Figure 4:
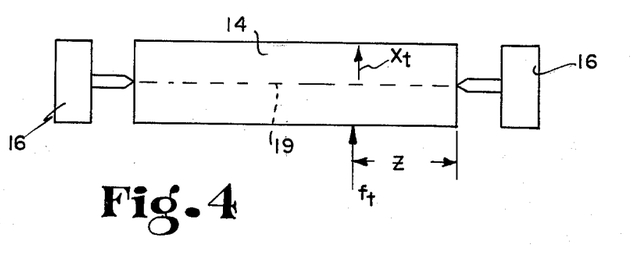
FIG. 4 is a schematic representation illustrating the determination of the mechanical compliance of a workpiece.
Figure 5:
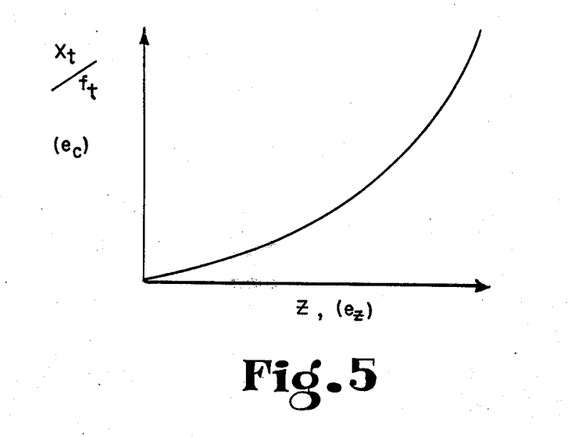
FIG. 5 is a graphic representation of the compliance of a workpiece and of the output of a non-linear function generator in response to a specified input.

To account for variations in workpiece compliance, it is first necessary to determine the workpiece compliance. This is accomplished, as shown in FIG. 4, by supporting the workpiece on its center supports 16 and by applying a test force ($f_t$) at a plurality of distances ($z$) from one supported end of the workpiece. By measuring with an suitable test apparatus the deflection ($x_t$) of the workpiece central axis 19 in response to the applied test force ($f_t$), a computation of the workpiece compliance can be obtained. This compliance for each point of test force application equals the deflection divided by the applied test force ($x_t/f_t$). The compliance values for each distance ($z$) can then be plotted as a function of the distance ($z$) as shown in FIG. 5. As shown, these compliance values ($x_t/f_t$) comprise a non-linear function of the distance ($z$). Alternately, the compliance curve shown in FIG. 5 can be mathematically approximated from a knowledge of the workpiece dimensions by conventional static force analysis.

As shown in FIGS. 1–3, a measurement of the position of the grinding wheel 12 along the longitudinal length of the workpiece 14 is obtained from a linear potentiometer 59 mounted on the grinding wheel assembly 13. This potentiometer 59 is conventionally mounted so that it moves a slider (not shown) to linearly vary the D. C. output of the potentiometer according to the distance of the grinding wheel from a supported end of the workpiece 14. That is, the potentiometer 59 monitors the position of the grinding wheel along the workpiece, and thereby provides a linearly variable signal representing the distance ($z$) along the length of the workpiece at which the cutting force is applied to the workpiece.

The linear potentiometer 59 thus generates an electrical output ($e_z$) representing the location of the cutting force along the workpiece length. This output ($e_z$) is used as an input to a non-linear function generator 60 which responds to the ($e_z$) signal to produce a non-linear output ($e_c$) matching the compliance curve in FIG. 5, and thereby representing the workpiece compliance at each instant during the machining operation. The non-linear function generator 60 conveniently comprises any of a wide variety of commercially available non-linear function generators, such as a diode function generator or the like. Importantly, it is only necessary that the non-linear generator be capable of generating an output ($e_c$) approximating the workpiece compliance curve of FIG. 5 in response to a linearly variable position signal ($e_z$) from the linear potentiometer 59. Because non-linear function generators are well known in the art, and because the values of the signals ($e_c$) and ($e_z$) must be determined either experimentally or mathematically for each different type of workpiece, no specific construction of the non-linear function generator is shown in the drawings.

Figure 6:
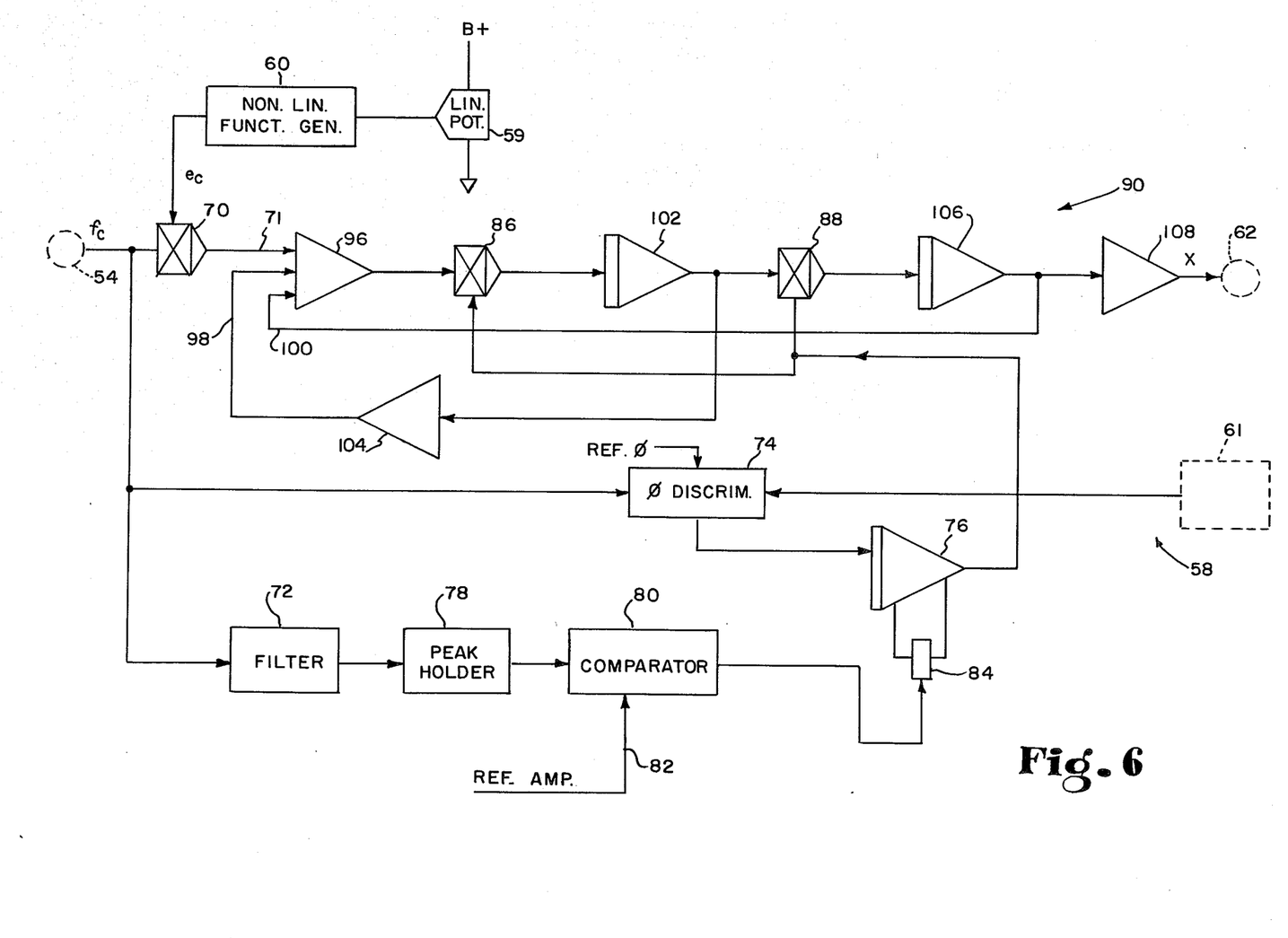
FIG. 6 is a circuit diagram illustrating the workpiece movement synthesis circuit.

The workpiece movement synthesis circuit 58 is shown in detail in FIG. 6. As shown, the electrical output of the summing junction 54, representing the cutting force sensed by the force transducer 22 is coupled to an initial multiplier 70, and as one input to a phase discriminator 74. Another input for the phase discriminator 74 is obtained from the motion derivation circuit 61, whose output represents the actual displacement of the grinding wheel at each instant during the machining operation. The phase discriminator 74 compares the phases of the incoming signals from the summing junction 54 and the motion derivation circuit 61 to arrive at a phase difference therebetween.

In machining operations it has been found that for a non-chatter condition to exist, there must be a phase difference between the cutting force applied to the workpiece and the actual displacement of the workpiece in response to that cutting force of approximately 135°. And since no chatter occurs when the grinding wheel displacement equals the workpiece displacement, it has been found that the phase of the grinding wheel displacement signal from the motion derivation circuit 61 must also differ from the phase of the cutting force signal by approximately 135°. Therefore, the phase difference between the cutting force signal and the wheel displacement signal as determined by the phase discriminator 74 is compared with a constant reference phase shift signal, e.g., 135°. Whenever the cutting force and wheel displacement signals do not differ in phase by 135°, it is presumed that chatter is occurring at the wheel/workpiece interface, and the phase discriminator 74 applied a voltage signal representative of the difference in phase from 135° to a sample and hold integrator 76.

The cutting force signal from the summing junction 54 is also applied to a high pass filter 72 of the synthesis circuit 58. The filter 72 serves to eliminate, or block, any static or low frequency noises in the incoming cutting force signal so that only relatively high frequency signals are applied to a peak holder 78. This is because chatter is inherently relatively high in frequency. The filter 72 is thus chosen to have an output only when chatter is present, and such output is representative of the occurring chatter. The peak holder 78 transforms the relatively high frequency filter output in a constant D.C. signal of the same amplitude, which is thereby indicative of the magnitude of the chatter taking place. The output of the peak holder 78 is applied to a comparator 80 which compares the amplitude of the D.C. chatter signal with a constant threshold signal input 82. This is to assure that only chatter of a predetermined magnitude will be detected. If the chatter signal is greater than the predetermined magnitude of the threshold signal, the comparator 80 produces an electrical output which is applied to the hold section 84 of the sample and hold integrator 76. This output enables integration of the incoming signal from the phase discriminator 74 so that the output of the integrator 76 is a ramp function. This ramp function is related to the natural vibrating frequency of the workpiece as well as the workpiece stiffness. The integrator output is applied to two parameter specifying multipliers 86 and 88 for altering parameter values of a mainstream computational portion 90 of the synthesis circuit, as will be hereafter described.

The mainstream computational portion 90 of the workpiece movement synthesis circuit 58 is used to solve an algorithm describing the displacement of the workpiece 14 in response to the applied cutting force. This algorithm is generally adequately represented by a second order differential system, as in apparent from the analog circuitry shown in FIG. 6. More specifically, this second order differential system is generally of the form $f_c/k = \ddot{x}/w_n^2 + 2 l \dot{x}/w_n + x$ wherein:

$f_c$ = the magnitude of the cutting force signal from the output of the summing junction 54, $x$ = the horizontal displacement of the workpiece in response to the cutting force, $w_n$ = the natural vibrating frequency of the workpiece, $l$ = the representative damping ratio of the workpiece, and $k$ is a constant representing workpiece stiffness.

As shown in FIG. 6, the cutting force signal from the summing junction 54 is applied to the initial multiplier 70. The multiplier has a second input from the non-linear function generator 60 for multiplying the cutting force signal by the continuously changing compliance signal ($e_c$). The output of the multiplier 70 is then applied as one input 71 to a summing amplifier 96 which, as will become more apparent hereafter, has a output representing the negative of the horizontal workpiece acceleration divided by a value representative of the square of the workpiece natural frequency. This output is applied to a first parameter specifying multiplier 86 which has its parameters continuously varied by the ramp function output of the integrator 76 in accordance with the continuously changing workpiece natural frequency. The output of the multiplier 86 thus represents the negative of the horizontal component of workpiece acceleration over a value representative of the workpiece natural frequency.

The output of the first multiplier 86 is applied to a first integrator 102 for obtaining a signal representing the horizontal component of workpiece velocity over a value representative of the workpiece natural frequency. This signal is applied to a second parameter specifying multiplier 88, as well as to an inverting amplifier 104. The inverting amplifier inverts said signal and multiplies the same by a factor representing twice the workpiece damping ratio for use as one input 98 to the summing amplifier 96. Importantly, the natural damping ratio of the workpiece is determined by conventional analysis independent of the machining process. Since the damping ratio for different types of workpieces will vary, this factor must be determined before machining material from the workpiece.

The second multiplier 88 also has its parameters continuously varied by the ramp signal from the integrator 76. The output of the multiplier 88 thus represents the horizontal component of workpiece velocity, and this output is appliied to a second mainstream integrator 106. The integrator 106 provides a signal equalling the negative of the horizontal component of workpiece displacement. This signal is applied to the first integrator 96 as one input 100 thereto, and is also inverted by an inverter 108 to form the output of the synthesis circuit 58.

The output of the inverter 108 thus represents the calculated, or predicted, horizontal displacement of the workpiece in response to the cutting force applied thereto. This displacement is predicted by continuously updating the mainstream portion 90 of the synthesis circuit 58 in accordance with the continuously changing compliance and natural vibrating frequency of the workpiece. Such continuous updating, as will become apparent hereafter, is crucial to the satisfactory elimination of vibrational chatter and to allow the removal of material from the workpiece at the maximum possible machining rate.

The calculated workpiece displacement signal is coupled through a summing junction 62 to another summing junction 66, as shown in FIG. 3. This calculated workpiece displacement signal is compared at the latter summing junction 66 with the negative of the actual horizontal displacement of the grinding wheel 12 from the motion derivation circuit 61. By definition, if the calculated workpiece displacement in response to the cutting force does not equal the actual displacement of the grinding wheel at each instant during the machining process, vibrational chatter occurs. In the event of such inequality, the summing junction 66 has an electrical output signal, or error signal, having an amplitude and frequency representing the inequality, and thereby also representing the occurring chatter. This chatter representative error signal is electrically coupled to a compensatory force actuator 24 mounted on the machine structure 10.

As shown in FIGS. 1–3, the compensatory foce actuator 24 is mounted on the machine structure 10 substantially in line horizontally with the central axis of the grinding wheel 12. The actuator 24 comprises a bidirectional force delivering assembly having an actuator housing 27 containing a force actuator, preferably of the hydraulically controlled piston variety. The actuator within the housing 27 controls the movement of a shaft 23 between the machine structure 10 and a mass 26 in a manner to provide forces of a given frequency, direction, and amplitude to the machine structure to counteract forces resulting from the occurrence of chatter. More specifically, the error signal from the summing junction 66 actuates the compensatory actuator 24 to apply compensatory forces to the machine structure 10. These compensatory forces are conveniently applied to the structure in generally the same horizontal plane as the cutting force to supplement the effects of the cutting force on the workpiece 14. In this manner, the compensatory forces adjust the position of the grinding wheel 12 to follow the position of the workpiece to offset, and thereby eliminate vibrational chatter. Alternately stated, if the workpiece is vibrating, the compensatory forces cause the grinding wheel to vibrate along with the workpiece to eliminate chatter. Similarly, if the grinding wheel is vibrating, the compensatory forces impart equal and opposite vibratory forces to the grinding wheel to eliminate vibrations and thereby eliminate chatter.

The amplitude and frequency of vibrational chatter arising in a machining operation is dependent upon many factors, such as the mass of the machine, the size and shape of the workpiece, etc. Therefore, the specific force amplitude and frequency requirements which must be matched by the compensatory actuator 24 will differ for different machines. However, it is contemplated that the compensatory actuator 24 must have a frequency capability of on the order of 30 to 50 hertz, with the specific mass widely varying according to the mass of the machine.

The compensatory forces, when applied to the machine structure 10, cause the grinding wheel 12 to follow the workpiece 14 to offset chatter vibrations. Thus, the compensatory forces adjust the output of the motion derivation circuit 61 which represents the actual wheel displacement, and which is compared with the calculated workpiece displacement at the summing junction 66. This adjustment reduces the error signal to zero and thereby eliminates chatter.

In the embodiment of the invention illustrated in FIGS. 1 and 2, the compensatory forces also have an effect upon the calculation of the workpiece displacement in response to cutting force. That is, when compensatory forces are directed to the right against the machine structure 10 as shown in FIG. 1, the compensatory forces tend to lift the machine structure 10 clockwise about its pivot shaft 29 to adjust the position of the grinding wheel. Similarly, compensatory forces directed to the left against the mass 26 tend to turn the machine structure counterclockwise about its pivot shaft 29. These compensatory forces supplement the initially applied cutting force on the workpiece with forces directed to the right serving to increase the cutting force, and forces directed to the left serving to decrease the cutting force. The cutting force output of the transducer 22 is, therefore, increased or decreased according to the direction of application of compensatory forces.

The compensatory forces also have an adverse effect upon the output of the cutting force transducer 22. For example, when a compensatory force is directed to the right against the machine structure 10, the compensatory force tends to lift the machine structure from the transducer 22, and thereby mechanically decreases the magnitude of the transducer output. In this case, the transducer output equals the total cutting force on the workpiece as reflected through the grinding wheel and machine structure, less the effects of the compensatory force reflected from the point of compensatory force application directly through a machine structure to the transducer 22. Similarly, when a compensatory force is directed to the left against the mass, the transducer 22 output is mechanically increased, and equals the reflected total cutting force plus the effects of the compensatory force reflected directly through the machine structure to the transducer 22.

To compensate for the effects of compensatory forces directly upon the transducer 22, a second force transducer 25 is mounted on the machine structure 10 at the point of application of the compensatory forces. This second transducer 25 has an output representative of the magnitude and frequency of the compensatory forces applied to the machine structure. This compensatory force output is electrically connected to an actuator force synthesis circuit 56, and to an actuator caused movement synthesis circuit 64.

The actuator force synthesis circuit provides an electrical output simulative of the effects of the compensatory forces reflected directly through the machine structure and detected by the cutting force transducer 22. That is, the circuit 56 alters the compensatory force input from the compensatory transducer 25 to account for static and dynamic alteration of the compensatory forces as they are reflected through the machine structure 10 and detected by the cutting force transducer 22. The synthesis circuit generates an electrical output representing this simulated effect of the compensatory forces on the cutting force transducer, and this output is applied to the summing junction 54 for summation with the output of said cutting force transducer. In this manner, the effects upon the output of the transducer 22 of compensatory forces directed to the right against the machine structure 10 are electronically simulated and added to the transducer 22 output, whereas the effects of compensatory forces directed to the left against the mass 26 are electronically simulated and subtracted from the transducer 22 output. The output of the summing junction 54 thus always represents the cutting forces exerted on the workpiece, regardless of whether compensatory forces are being applied to the machine structure.

The exact parameters and construction of the actuator force synthesis circuit 56 are determined during initial set-up of the machine. First, with all other force generating components rendered inoperative, compensatory forces are applied to the machine structure 10. These compensatory forces are applied over a broad magnitude and frequency range while they are monitored by means of the compensatory force transducer 25. At the same time, the effects of these compensatory forces upon the cutting force transducer 22 output are monitored simply by reading the output of said transducer 22 for each applied compensation force. A graphical or mathematical correlation of the output of the compensatory force transducer 25 with each corresponding output of the cutting force transducer 22 yields the appropriate parameters of the synthesis circuit 56. The synthesis circuit 56 can then be constructed from the desired electronic components so that the circuit output equals the opposite of the cutting force transducer 22 output in response to applied compensatory forces.

Figure 7:
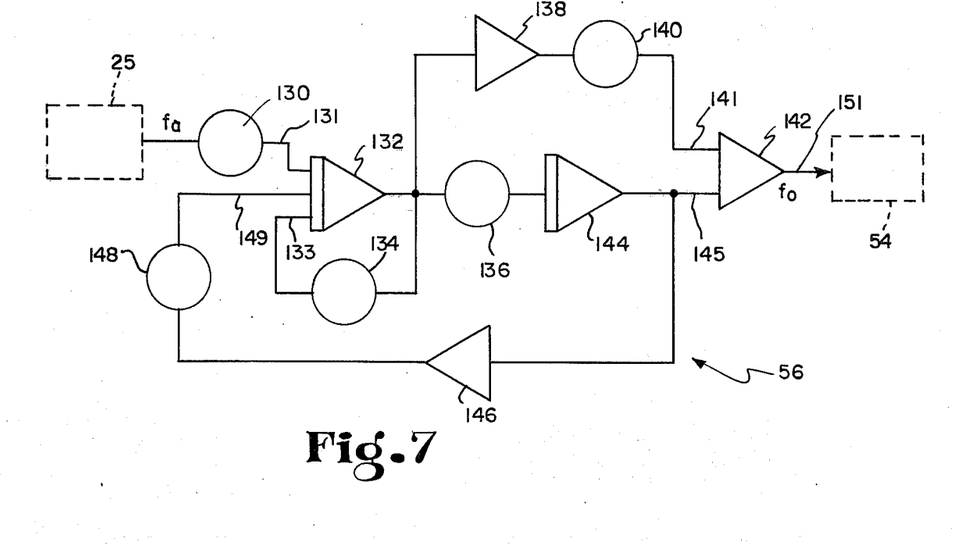
FIG. 7 is a circuit diagram of one possible form of the actuator force synthesis circuit.

Importantly, the synthesis circuit 56 need only be capable of matching the effects of compensatory forces on the cutting force transducer 22 as those compensatory forces are inherently altered by the static and dynamic characteristics of that portion of the machine structure between the transducers 25 and 22. For this reason, no exact parameters of the circuit are disclosed, and no specific circuit hardware is preferred. The circuit parameters and hardware will necessarily differ for each different machine structure, according to the mechanical characteristics of that structure. Further, it is contemplated that different types of electronic synthesizing circuits are usable, such as for example, analog or digital circuitry. However, for purposes of illustration only, one possible circuit structure for the synthesis circuit 56 is shown in FIG. 7.

In many embodiments of this invention, the actuator force synthesis circuit 56 will model a second order differential relation between the output of the compensatory force transducer 25 and the effects of those compensatory forces on the transducer 22. This relation will generally be of the form:

$$\ddot{f}_o/w_1^2 + 2 l_1 \dot{f}_o/w_1 + f_o = -2 l_1 \dot{f}_a/w_1 - f_a$$

wherein:

$f_a$ = the applied compensatory force, $f_o$ = the output of the transducer 22 in response to $f_a$, $w_1$ = the natural resonant frequency of that portion of the machine structure between the transducers 25 and 22, and $l_1$ = the damping ratio of that portion of the machine structure between the transducers 25 and 22.

As shown in FIg. 7, the circuit constructed according to this second order differential system has an input from the compensatory force transducer 25 representing the compensatory force ($f_a$). The compensatory force signal is coupled to a potentiometer 130, and from there as one input 131 to an integrating amplifier 132. The output of the integrator 132 is coupled to (a) a potentiometer 134 and from there as a second input 133 to the integrator 132, (b) a potentiometer 136, and (c) an inverting amplifier 138. The output of this inverting amplifier 138 is altered by another potentiometer 140 and applied as one input 141 to a final inverting amplifier 142.

The output of the potentiometer 136 is coupled to a second integrating amplifier 144 whose output is used as a second input 145 to the final inverter 142. The output of the integrator 144 is also inverted by an inverter 146 and altered by a potentiometer 148 before being coupled as a third input 149 to the first integrator 132.

In the construction of the synthesis circuit 56 shown in FIG. 7, the potentiometers 130, 136, and 148 are each set to have a gain of $w_1$. The potentiometer 140 is set to have a gain of $2 l_1$, and the potentiometer 134 is set to have a gain of $2 l_1 w_1$. With these parameters, the output 151 of the final inverter 142 represents ($f_o$), which is the force effects of the compensatory forces ($f_a$) on the output of the cutting force transducer 22. Again, it should be understood that this specific circuit is only representative of a general relationship between ($f_a$) and ($f_o$), and that the exact circuit parameters (e.g., $l_1$, $w_1$, etc.) must be determined experimentally for each machine structure.

The summed output of the summing junction 54 thus represents the total cutting force exerted upon the workpiece 14, including the effects of compensatory forces, at each instant during the machining operation. This summed output is applied to the workpiece movement synthesis circuit 58, as previously described. The output of the workpiece movement synthesis circuit 58 thus represents the calculated displacement of the workpiece in response to all cutting forces, which include any compensatory forces as applied through the machine structure 10 to the grinding wheel 12.

When compensatory forces are applied to the machine structure, some vibrating effect of the compensatory forces is reflected through the machine structure 10 and the machine base 30 to the workpiece center supports 16. Thus, the applied compensatory forces applied to the machine structure causes some displacement of the workpiece 14, and this component of workpiece displacement is not affected by the cutting force. For this reason, the actuator caused movement synthesis circuit 64 is provided. This synthesis circuit 64 responds to the output of the compensatory force transducer 25 to simulate the workpiece displacement in response to the compensatory forces reflected through the base 30 to the center supports 16. This simulated displacement factor is added by the summing junction 62 to the workpiece displacement signal calculated by the synthesis circuit 58. Thus, the output of the summing junction represents the total calculated workpiece displacement in response to the total cutting force and to the effects of the compensatory forces reflected through the machine base. This total displacement signal is compared with the actual displacement signal from the motion derivation circuit 61 at the final summing junction 66 to control generation of any error signal, which in turn controls the compensatory force actuator 24.

The exact parameters and the physical construction of the actuator caused movement synthesis circuit 64 is determined in much the same manner as the parameters and the construction of the actuator force synthesis circuit 56. That is, compensatory forces are applied to the machine structure 10, with all other force generating components rendered inoperative. These forces are applied over a relatively wide amplitude and frequency range while the displacement of the workpiece in response to these compensatory forces is measured by any suitable means. A graphical or mathematical correlation of the workpiece displacement in response to the applied compensatory forces yields the parameters of the synthesis circuit 64. The circuit can then be constructed from the desired electronic components so that the circuit output is an electrical signal representing the workpiece displacement in response to applied compensatory forces reflected through the machine structure, base, and workpiece center supports.

Figure 8:
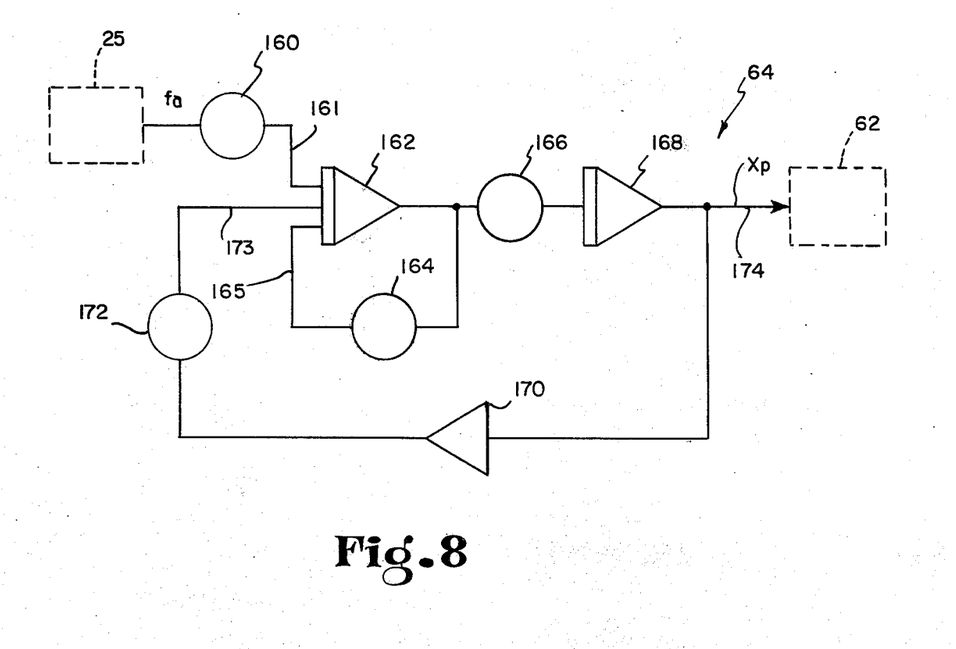
FIG. 8 is a circuit diagram of one possible form of the actuator caused movement synthesis circuit.

As with the actuator force synthesis circuit 56, the actuator caused movement synthesis circuit 64 need only be capable of matching the effects of compensatory forces on the workpiece displacement as those cutting forces are inherently altered by the static and dynamic characteristics of the machine structure 10, the machine base 30, and the workpiece center supports 16. Since these static and dynamic characteristics are different for each application of the invention, the exact circuit parameters are not disclosed, and no specific circuit hardware is preferred. The circuit parameters must be experimentally determined for each machine, and the specific circuit hardware can be comprised of any convenient electronic components such as analog or digital circuitry. However, for purposes of illustration, one example of a possible circuit for the actuator caused movement synthesis circuit 64 is illustrated in FIG. 8.

Similar to the actuator force synthesis circuit 56, the actuator caused movement synthesis circuit 64 often models a second order differential system generally of form:

$$\ddot{x}_p/w_2^2 + 2 l_2 \dot{x}_p/w_2 + x_p = f_a/k_2$$

wherein:

$x_p$ = the workpiece displacement in response to compensatory forces reflected through the machine structure, base, and the workpiece center supports, $f_a$ = the applied commpensatory force, $l_2$ = the damping ratio of the machine structure, base, and center supports, $w_2$ = the natural resonant frequency of the machine structure, base, and center supports, and $k_2$ = is representative of the mechanical stiffness of the machine structure, base, and center supports.

As shown in FIG. 8, the circuit according to this second order differential system has an input from the compensatory force transducer 25 representing the applied compensatory force ($f_a$). The compensatory force signal is applied to a potentiometer 160, and further as one input 161 to an integrating amplifier 162. The integrator output is coupled through a potentiometer 164 to a second input 165 of the integrator 162, and through another potentiometer 166 to a second integrator 168. The output of this second integrator by another potentiometer 172 for application as a third input 173 to the first integrator 162. The output of this second integrator also comprises the output of the synthesis circuit 64 and is coupled to the summing junction 62.

In the construction of this circuit, the potentiometers 166 and 172 are set to have a gain of $w_2/k_2$, and the potentiometer 164 is set to have a gain of $2 l_2 w_2$. With these experimentally determined parameters, the final output 174 of the circuit represents the displacement of the workpiece in response to compensatory forces acting through machine structure, base, and workpiece center supports. This output summed at the summing junction 62 with the calculated workpiece displacement signal for the synthesis circuit 58 to form a total workpiece displacement signal.

The total workpiece displacement signal is compared at the summing junction 66 with the actual displacement of the grinding wheel to control generation of the error signal. If the workpiece and grinding wheel displacements are identical, no chatter occurs and the compensatory force actuator 24 is not activated. When this is the case, the outputs of the actuator force synthesis circuit 56 and the actuator caused movement synthesis circuits are zero.

In the above-described preferred embodiment of the invention, the workpiece movement synthesis circuit 58 provided a signal representing the calculated workpiece displacement in response to the applied cutting force. This circuit 58 performed this calculation of workpiece displacement by a continuous and instantaneous updating of its circuit parameters according to continuous changes in the static and dynamic workpiece characteristics. The synthesis circuit 58 did not, however, provide any means for continuously updating the static and dynamic characteristics of the machine structure 10. This is because the characteristics of the machine structure typically do not change substantially during a machining operation, and therefore do not require updating. If the invention were used with a machine structure, or cutting tool, which experienced substantial changes during a machining operation, an updating circuit analogous to the synthesis circuit 58 could be used.

It should be apparent from the foregoing description that a variety of modifications of this invention are possible without departing from the scope thereof. For example, as shown in the double integrating circuit 101 of FIG. 9, it is possible to determine the cutting force on the workpiece from the output signal of the accelerometer 28, instead of using the cutting force transducer 22. As shown, an additional output is taken from the accelerometer 28 and is applied to a potentiometer 102, whose output is coupled to both an integrating amplifier 104 and to a summing amplifier 106 via a line 108. The output of the integrator 104 is applied to a second potentiometer 110 which has its output coupled to a second integrator 112, and through an inverting amplifier 114 for use as a second input 116 to the summing amplifier 106.

Figure 9:
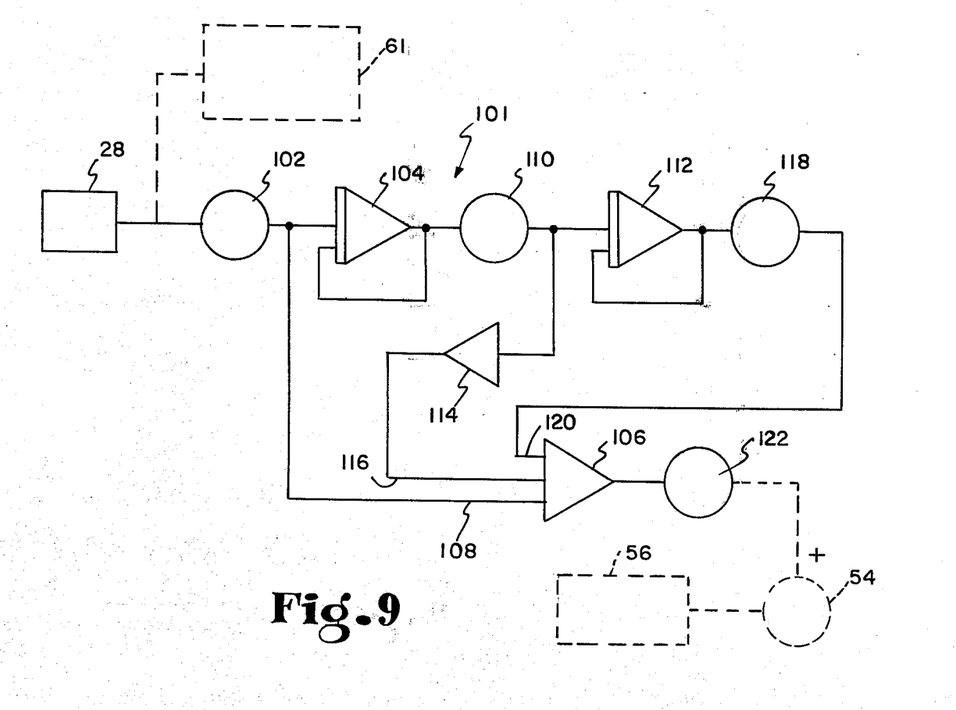
FIG. 9 is a circuit diagram of alternate means for use in cutting force detection.

The output of the second integrator 112 is also supplied through a third potentiometer 118 to a third and last input 120 of the summing amplifier 106. The output of this summing amplifier 106 is then applied through a potentiometer 122 to represent the cutting force on the workpiece 14. This cutting force output is applied in the same manner as before to the summing junction 54.

The output of the circuit 101 is affected, to some extent, by compensatory forces on the accelerometer acting through the machine structure 10 and detected by said accelerometer. Thus, it is necessary to electronically synthesize these effects on the accelerometer in the same manner as in the principal embodiment with an actuator force synthesis circuit 56'. The output of the circuit 56' is applied to the summming junction 54 with the appropriate sign convention so that the summing junction 54 output represents the total cutting force applied to the workpiece.

The actual parameters of the circuit 101 shown in FIG. 9 are determined experimentally in much the same manner as the previously described synthesis circuits 56 and 64. That is, during machine set-up, a range of known cutting forces are applied to the workpiece while the output of the summing amplifier 106 is monitored to represent each cutting force. The three potentiometers 102, 110, and 118 are then set to take into account the physical characteristics of the machine structure 10. In effect, these potentiometers are respectively set to have gains representing (a) one over the square of the natural machine structure frequency, (b) twice the product of the machine structure damping ratio and natural resonant frequency, and (c) the machine structure natural resonant frequency over twice the damping ratio. The output of the last potentiometer 122 in the circuit 101 is then appropriately adjusted to bring the circuit output signal into the proper amplitude so that said output represents the cutting force exerted upon the workpiece.

Another possible modification of this invention involves the replacement of the double integrating motion derivation circuit 61 with a single integration circuit to provide an output equalling the actual grinding wheel velocity. In this modification, the construction of the workpiece movement synthesis circuit 58 and the actuator caused movement synthesis circuit 64 would require alternation so that the output of the summing junction 62 represents the calculated workpiece velocity. Then a comparison of workpiece and grinding wheel velocities would be made at the summing junction 66 for controlling generation of the error signal.

Figure 10:
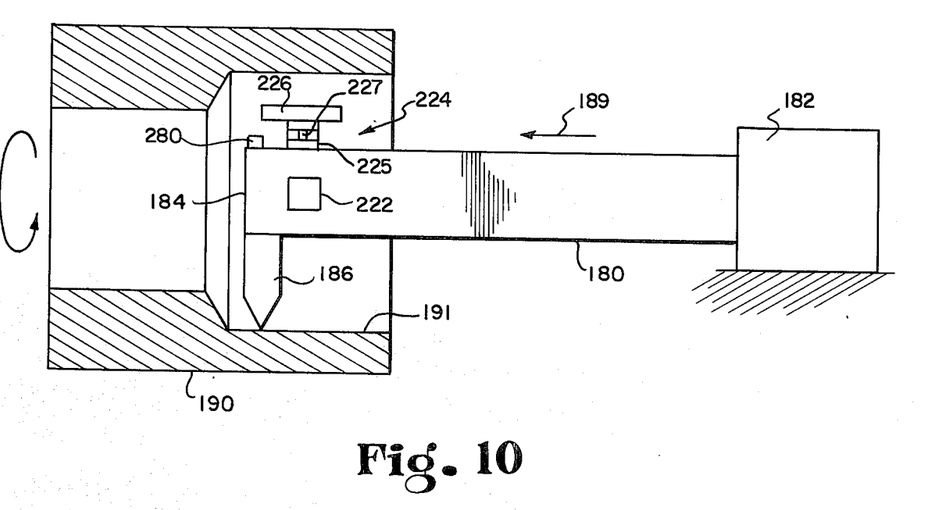
FIG. 10 is a diagrammatic side view, in partial section, illustrating the use of the invention with a boring bar machine tool.

The foregoing description has been directed specifically to the application of the invention with a conventional-type grinding operation to eliminate vibrational chatter. However, the invention is equally applicable to any type of machining operation wherein material is removed from a workpiece. For example, the invention can be used in a boring bar machine as is illustrated in FIG. 10. In such an application, a boring bar 180 is mounted in a conventional tool advancing and supporting structure 182. The appropriate cutting tool 186 is conventionally mounted at the forward end 188 of the boring bar 180 and at approximately a right angle thereto. Under control of the feeding mechanism 182, the tool is advanced in the direction of arrow 189 into a rotating workpiece 190 to remove material from the inner wall 191 thereof.

A cutting force transducer 222 is appropriately secured to the boring bar to detect the cutting forces present at the tool and workpiece interface as the cutting forces are reflected from said interface back through the bar 180. An accelerometer 228 is located in proximity to the end 184 of the boring bar 280 to generate a signal indicative of the cutting tool acceleration in a plane normal to the boring bar. A compensatory force actuator 224 is, as in the grinder embodiment, mounted within an actuator housing 227 and retained between a compensatory force transducer 225 on the boring bar and a mass 226.

The cutting force detector 222 provides an input to a workpiece movement synthesis circuit similar to the one shown in FIG. 6. The workpiece movement synthesis circuit has an electrical output representing the calculated workpiece displacement in response to the cutting force and according to continuously varying static and dynamic workpiece characteristics. This calculated workpiece displacement is compared with a signal representing the actual displacement of the cutting tool to control generation of an error signal. The error signal controls the operation of the compensatory force actuator 224 to react between the boring bar 180 and the mass 226 to generate forces of the appropriate magnitude and frequency to offset and eliminate vibrational chatter.

As in the grinder embodiment, an actuator force synthesis circuit and an actuator caused movement synthesis circuit are provided when the invention is used in a boring bar operation. The actuator force synthesis circuit synthesizes the direct effects of compensatory forces upon the output of the cutting force transducer 222. The output of the actuator force synthesis circuit is then added to the cutting force transducer 222 output to offset these undesirable compensatory effects. Similarly, any workpiece displacement resulting from the action of compensatory forces not acting through the cutting tool are synthesized by the actuator caused movement synthesis circuit for appropriate addition to the output of the workpiece movement synthesis circuit.

We claim:

1. An apparatus for controlling a machining operation wherein a workpiece and a machining tool are mounted in a machine structure and one of said workpiece and tool is moved with respect to the other to cause said tool to exert a machining force on said workpiece and to remove material therefrom, comprising first transducer means connected to the machine structure at a position spaced from said tool and workpiece for detecting a force representative of the machining force and for generating a first electrical signal corresponding thereto; second transducer means connected to the machine structure for detecting the actual motion of one of said tool and workpiece in response to the machining force and for generating a second electrical signal corresponding thereto; a synthesis circuit electrically coupled to said first and second transducer means for generating a synthesized electrical signal representative of the motion in response to the machining force of the one of said tool and workpiece not connected to said second transducer means, said synthesis circuit having updating circuit means responsive to said first and second electrical signals for continuously altering parameters of said synthesis circuit in accordance with changes in the machine static and dynamic characteristics; comparison means for comparing said second electrical signal with said synthesis signal and for generating an error signal in accordance therewith; and compensatory force means electrically coupled to said comparison means and having mechanical means for delivering compensatory forces to the machine structure in response to said error signal for maintaining said tool and workpiece in predetermined spatial relationships during the machining process irrespective of vibratory movements of said workpiece, tool, or machine structure.

2. Apparatus as set forth in claim 1 with the addition of third transducer means connected to said compensatory force means for detecting the compensatory forces delivered thereby to the machine structure and for generating a third electrical signal representative thereof; said third electrical signal being coupled to said synthesis circuit for offsetting any compensatory force effects unrelated to cutting force supplementation upon the output of said first transducer means.

3. Apparatus as set forth in claim 1 with the addition of third transducer means connected to said compensatory force means for detecting the compensatory forces delivered thereby to the machine structure and for generating a third electrical signal representative thereof; and a second synthesis circuit having said third electrical signal coupled thereto for generating a second synthesized electrical signal representative of the motion in response to the compensatory force effects unrelated to cutting force supplementation of the one of said tool aand workpiece not connected to said second transducer means, said second synthesized electrical signal being coupled to the output of said first synthesis circuit for producing a motion signal representative of the total motion of the one of said tool and workpiece not connected to said second transducer means.

4. Apparatus as set forth in claim 1 wherein said second transducer means comprises an accelerometer mounted on the machine structure adjacent one of said tool and workpiece for measuring the acceleration thereof and for generating a signal corresponding thereto, said accelerometer being coupled to circuit means for converting said acceleration representative signal to said second electrical signal representative of displacement of said one of said tool and workpiece.

5. Apparatus as set forth in claim 1 wherein said updating circuit means comprises phase discriminating means for monitoring the actual difference in electrical phase angle between first and second electrical signals, for comparing said actual phase angle difference to a predetermined phase angle difference, and for generating an updating signal corresponding to any inequality between said actual phase angle difference and said predetermined phase angle difference for continuously altering parameters of said synthesis circuit.

6. Apparatus as set forth in claim 5 wherein said updating circuit means further comprises frequency and amplitude discriminating means for determining when said first electrical signal exceeds a predetermined frequency and amplitude and for enabling alteration of synthesis circuit parameters in accordance with said updating signal whenever said predetermined frequency and amplitude are exceeded.

7. Apparatus as set forth in claim 1 wherein said machining tool is moved with respect to the workpiece to traverse the length of the workpiece, said updating circuit means comprising first generating means mechanically coupled to said tool for generating a linearly variable signal indicative of the position of said tool along the length of said workpiece, and second generating means coupled between said first generating means and said synthesis circuit for generating a non-linearly variable signal in response to the position signal, said non-linearly variable signal varying predeterminably and being coupled to said synthesis circuit for continuously altering parameters thereof.

8. Apparatus as set forth in claim 7 wherein said non-linearly variable signal is representative of the mechanical compliance of the workpiece in accordance with the position of the tool with respect thereto.

9. An apparatus for controlling a machining operation wherein a workpiece and a machining tool are mounted in a machine structure and one of said workpiece and machining tool is moved with respect to the other to cause said tool to exert a machining force on said workpiece and to remove material therefrom, comprising first transducer means connected to one of said tool and said workpiece for detecting the actual motion thereof and for generating an electrical signal representative of said actual motion; a force signal generation circuit coupled to said first transducer means for acting on said motion signal to generate a force signal representative of the machining force; a synthesis circuit electrically coupled to said force signal generation circuit and to said first transducer means for generating a synthesized electrical signal representative of the motion in response to the machine force of the one of said tool and workpiece not connected to said first transducer means, said synthesis circuit having updating circuit means responsive to the signals generated by said force signal generation circuit and said first transducer means for continuously altering parameters of said synthesis circuit in accordance with changes in the static and dynamic characteristics of the workpiece; comparison means for comparing said motion signal generated by said first transducer means and said synthesized signal to generate an error signal in accordance with the compared signals; and a compensatory force actuator electrically coupled to said comparison means and mechanically coupled to said machine structure for delivering compensatory forces to the machine structure in response to said error signal to maintain said tool said workpiece in a predetermined spatial relationship during the machining process irrespective of any vibratory movements of said workpiece with respect to said tool.

* * * * *

UNITED STATES PATENT OFFICE
CERTIFICATE OF CORRECTION

Patent No. 3,967,515          Dated July 6, 1976

Inventor(s) Chester L. Nachtigal et al

It is certified that error appears in the above-identified patent and that said Letters Patent are hereby corrected as shown below:

At the end of the first paragraph in the "Background of the Invention", insert the following sentence:
--The Government has rights in this invention pursuant to Grant No. NSF 73-79-GK5699 awarded by the National Science Foundation.--.

Column 2, line 59, change "structures" to --structure--.
Column 6, line 2, change "wheel-workpiece" to --wheel/workpiece--.
Column 6, line 14, change "gringing" to --grinding--.
Column 7, line 1, change "an" to --any--.
Column 8, line 44, change "parameter" to --parameters--.
Column 8, line 53, change "in" to --is--.
Column 9, line 5, change "a" to --an--.
Column 10, line 5, change "foce" to --force--.
Column 14, line 42, before "by", insert --168 is inverted by an inverting amplifier 170 and altered--.
Column 18, line 13, after "between", insert --said--.
Column 20, line 2, after "tool", insert --and--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*